UNITED STATES PATENT OFFICE.

GEORGE W. GOETZ, OF PITTSBURG, PENNSYLVANIA, ASSIGNOR TO THE ORE REDUCTION COMPANY, OF SAME PLACE.

PROCESS OF EXTRACTING GOLD FROM ORES.

SPECIFICATION forming part of Letters Patent No. 416,781, dated December 10, 1889.

Application filed March 20, 1889. Serial No. 304,012. (No specimens.)

*To all whom it may concern:*

Be it known that I, GEORGE W. GOETZ, a citizen of the United States, residing at Pittsburg, in the county of Allegheny and State of Pennsylvania, have invented or discovered a certain new and useful Improvement in Processes of Extracting Gold from Ores, of which improvement the following is a specification.

My invention relates to processes of the general class or type known in the art as "chlorination," in which the extraction of gold from its ores is effected by subjecting the ore or auriferous gangue to the action of chlorine gas, by which the gold is dissolved, and thereafter precipitating the gold from the solution and melting it into ingots.

The object of my invention is to obviate the inconvenience and deleterious results due to the escape and diffusion of free chlorine into the atmosphere adjoining the apparatus in which the operation is conducted, to which end my invention, generally stated, consists in a novel process of treating the ore or gangue with a proportion of chlorine less than that which will suffice to extract the entire amount of contained gold, and dissolving the remaining portion of gold by the action of a proportion of bromine in excess of that sufficient to act as a solvent for such remaining proportion of gold.

The improvement claimed is hereinafter fully set forth.

The processes now known and practiced for the extraction of gold may be divided generally into those of smelting, amalgamation, and chlorination, and in the case of many ores a chlorination process is the only one which is successfully or desirably applicable. In the latter processes the ore is treated either with free chlorine gas or with a solution saturated therewith, and it is difficult in most of the apparatus employed and impossible in many to prevent the escape of the gas from time to time into the building in which the apparatus is located. This gas being of an extremely offensive and irritating character, its presence, even in small quantities, in the atmosphere about the apparatus is greatly objectionable by reason of the annoyance to and detrimental effect upon the health of the workmen which it occasions. The ordinary present practice is to charge the ore into a cylinder, together with the chemicals proper for the generation of chlorine, after which the charging-door is closed and the cylinder rotated for a sufficient period to effect the solution of the gold. When this has taken place, the contents of the cylinder are discharged upon a filter-bed having a large area for the purpose of separating the solution containing the gold from the ore pulp. In the discharge of the ore upon the filter-bed the free chlorine escapes into the working-rooms in such quantities as to cause much inconvenience and annoyance to the workmen, delaying an interfering with their work, as well as being prejudicial to their health and comfort, and this is found to be the case to a greater or less degree even when the gases are exhausted from the cylinder, as far as practicable, before opening the door to effect the discharge of its contents, as all solutions containing free chlorine will emit strong chlorine vapors, and an excess of chlorine must be present in the cylinder in order to hold the gold in solution.

My improvement is designed to enable the process of chlorination to be effectively conducted without involving the objection above stated.

In the practice of my invention I subject the pulverized ore, as heretofore, to the action of chlorine in any suitable closed vessel; but, in lieu of generating therein or supplying thereto the chlorine in sufficient quantity to dissolve all the gold which is present in the ore and to hold the gold in solution, I treat the ore with a quantity of chlorine less than that which is required for the solution of the entire amount of gold contained therein, so that there may remain a small proportion of undissolved gold, and effect the solution of the remaining proportion of gold by the action of bromine in sufficient quantity to present an excess above that which is required to dissolve the small proportion of gold remaining undissolved by the chlorine, the excess of bromine being added to prevent the reprecipitation of the gold, as well as to insure the solution of all which may remain after the action of the chlorine. The presence of free chlorine and the vitiation of the atmosphere by its diffusion is thereby avoided, and any fumes which may be evolved from an aqueous solution of bromine will not, either in character or amount, entail corresponding or any substantial objectionable results.

As an example of the proportions of chlorine-generating materials and of bromine proper to be employed, ten pounds of bleaching-powder or chloride of lime and fifteen pounds of sulphuric acid may be mingled with a ton of ore of such character that the chlorine evolved from said chemicals will be sufficient to dissolve, say, eighty-five per cent. of the gold in the ore, the chlorine generated being thereby entirely taken up, so that the solution will not give off any odor. By the addition of about one pound of bromine the remaining fifteen per cent. of gold will be taken up and sufficient bromine will be maintained to remain free in the solution and prevent a reprecipitation of the gold. The solution not being completely saturated with bromine, no deleterious fumes will escape from the treating-vessel or from the charge delivered on the filter-bed, as would be the case if free chlorine were present in the solution.

In the practice of my improved process the chlorine may either be brought in gaseous form to the pulverized ore from a generator in which it is separately evolved or be generated in contact with the ore from chemicals added thereto. I prefer to use bleaching-powder (chloride of lime) and sulphuric acid as the chlorine-generating chemicals and to add the required proportion of bromine in liquid form.

I claim as my invention and desire to secure by Letters Patent—

1. The improvement in the art of extracting gold from ores, which consists in treating pulverized auriferous ore with a proportion of chlorine less than that which is required to effect the solution of the entire amount of gold contained in the ore, and dissolving the remaining portion of gold by the action of bromine in greater proportion than that which is required to effect the solution of said remaining portion, substantially as set forth.

2. The improvement in the art of extracting gold from ores, which consists in mixing with pulverized auriferous ore chloride of lime and sulphuric acid in proportion which will generate less chlorine than that which will suffice to effect the solution of the entire amount of gold contained in the ore, and bromine in greater proportion than that which will suffice to effect the solution of the proportion of gold remaining undissolved by the generated chlorine, substantially as set forth.

In testimony whereof I have hereunto set my hand.

GEORGE W. GOETZ.

Witnesses:
J. SNOWDEN BELL,
F. E. GAITHER.